United States Patent
Zhu et al.

(10) Patent No.: US 9,076,066 B2
(45) Date of Patent: Jul. 7, 2015

(54) IMAGE PROCESSING DEVICE AND METHOD FOR DETERMINING A SIMILARITY BETWEEN TWO IMAGES

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jian-Jian Zhu, Shenzhen (CN); Yu-Kai Xiong, Shenzhen (CN); Xin Lu, Shenzhen (CN); Hui-Feng Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/100,012

(22) Filed: Dec. 8, 2013

(65) Prior Publication Data

US 2014/0169672 A1    Jun. 19, 2014

(30) Foreign Application Priority Data

Dec. 17, 2012   (CN) .......................... 2012 1 0547372

(51) Int. Cl.
G06K 9/00   (2006.01)
G06K 9/46   (2006.01)
G06K 9/62   (2006.01)

(52) U.S. Cl.
CPC ............ G06K 9/4642 (2013.01); G06K 9/6212 (2013.01)

(58) Field of Classification Search
CPC .......... G06F 17/3025; G06K 9/00523; G06K 9/4642
USPC ................ 382/170, 197, 305, 128, 195, 181; 386/52, 4
See application file for complete search history.

(56) References Cited

U.S. PATENT DOCUMENTS

| | | | |
|---|---|---|---|
| 5,530,907 A * | 6/1996 | Pavey et al. | 710/69 |
| 7,483,618 B1 * | 1/2009 | Edwards et al. | 386/278 |
| 8,249,360 B2 * | 8/2012 | Petersohn | 382/209 |
| 2003/0068100 A1 * | 4/2003 | Covell et al. | 382/305 |
| 2004/0218837 A1 * | 11/2004 | Shiyama | 382/305 |
| 2005/0058476 A1 * | 3/2005 | Murakami | 399/366 |
| 2012/0314919 A1 * | 12/2012 | Sparks et al. | 382/128 |
| 2013/0039550 A1 * | 2/2013 | Blum et al. | 382/128 |

* cited by examiner

*Primary Examiner* — Mekonen Bekele
(74) *Attorney, Agent, or Firm* — Novak Druce Connolly Bove + Quigg LLP

(57) ABSTRACT

A computerized method determines a similarity between a first image and a second image. The first image is converted into a first grayscale image, and the second image is converted into a second grayscale image. A first feature vector of the first grayscale image and a second feature vector of the second grayscale image are extracted. A similarity value is calculated indicating the similarity between the first image and the second image according to the first feature vector and the second feature vector. If the similarity value is greater than or equal to the predetermined threshold, the first image is similar to the second image and a determination result is outputted denoting the first image is similar to the second image.

8 Claims, 2 Drawing Sheets

IMAGE PROCESSING DEVICE AND METHOD FOR DETERMINING A SIMILARITY BETWEEN TWO IMAGES

BACKGROUND

1. Technical Field

The present disclosure relates to image processing technologies, and particularly to an image processing device and a method for determining a similarity between two images.

2. Description of Related Art

Determination of a similarity between two images is very important for image matching or image comparison. Typical methods for determining the similarity between two images are based on pixel comparison and feature comparison. The methods based on the pixel comparison compares all pixels between two images in order and then obtains an Euclid distance to determine a similarity between the two images, which is time-consuming and complex. The method based on the feature comparison is carried out by extracting basic features of the two images, such as texture features, and then compares the basic features of the two images to obtain the similarity between the two images. The method based on the feature comparison reflects an overall similarity between the two images, which does not reflect detail similarities between the two images.

Therefore, what is needed is a means to overcome the above described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
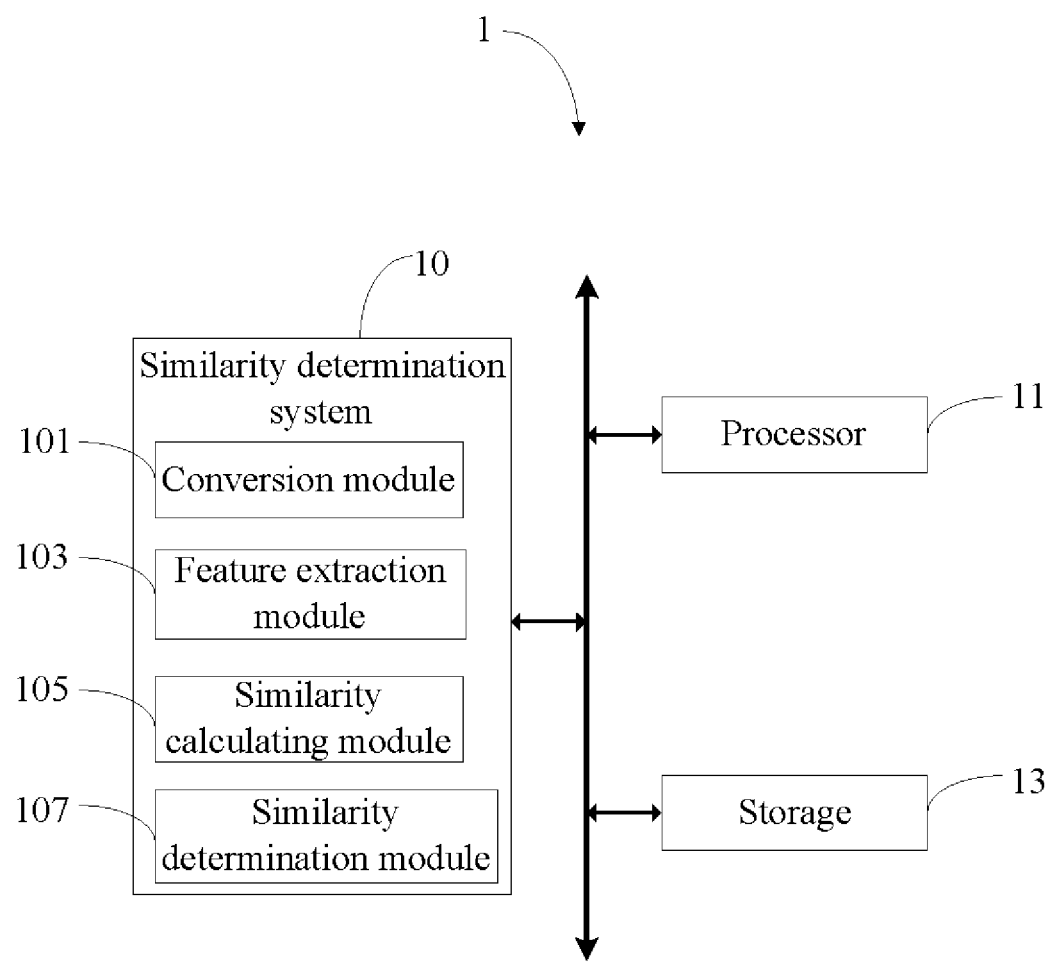
FIG. 1 is a schematic block diagram of an embodiment of an image processing device having a similarity determination system.

FIG. 1 shows a schematic block diagram of an embodiment of an image processing device 1. The image processing device 1 includes a similarity determination system 10, a processor 11, and a storage 13. The similarity determination system 10 is executed by the processor 11 for determining a similarity between a first image and a second image. The image processing device 1 can be, a computer, an image processing sever, or other similar device, for example. FIG. 1 is one example of the image processing device 1, and the image processing device 1 can include more or fewer components than those shown in the embodiment, or have a different configuration of the components.

The similarity determination system 10 can include a plurality of programs in the form of one or more computerized instructions stored in the storage 13 and executed by the processor 11 to perform operations of the image processing device 1. In the embodiment, the similarity determination system 10 includes a conversion module 101, a feature extraction module 103, a similarity calculating module 105, and a similarity determination module 107. In general, the word "module," as used herein, refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable medium or other storage device. Some non-limiting examples of non-transitory computer-readable medium include CDs, DVDs, BLU-RAY, flash memory, and hard disk drives.

The conversion module 101 converts the first image into a first grayscale image and the second image into a second grayscale image. The conversion module 101 can convert the first image and the second image according to values of red, green, and blue (RGB) of each pixel of the first image and the second image. In one embodiment, the conversion module 101 can calculate a grayscale value of each pixel of the first image using a formula, such as: G=R*0.3+G*0.59+B*0.11, and then generate the first grayscale image according to the grayscale value of each pixel of the first image. The second image can be converted using the same method as described above.

The feature extraction module 103 extracts a first feature vector of the first grayscale image and a second feature vector of the second grayscale image. In the embodiment, the first feature vector includes a set of a plurality of first proportion values, and each first proportion value of the first grayscale image is a ratio of a number of pixels having a grayscale value (0-255) to a total number of pixels; the second feature vector includes a set of second proportion values, and each second proportion value of the second grayscale image is a ratio of a number of pixels having a grayscale value to a total number of pixels.

In the embodiment, the feature extraction module 103 divides the first grayscale image and the second grayscale image into a grayscale histogram. The grayscale histogram is a graphical representation of a number of pixels of one grayscale value, and extracts the first and second feature vector from the grayscale histogram. In detail, the feature extraction module 103 divides the first and second grayscale images into n (n=$2^m$-1, m is a natural number) sub-grayscale histograms, and then extracts the first feature vector $V_a=\{g_{a0}, g_{a1}, g_{a2}, g_{a3} \ldots g_{an}\}$ wherein $g_{ai}$(0≤i≤n) is a ratio of a number of pixels with a grayscale value of i to the total number of the pixels of the first grayscale image, and the second feature vector $V_b=\{g_{b0}, g_{b1}, g_{b2}, g_{b3} \ldots g_{bn}\}$, wherein $g_{bj}$(0≤j≤n) is a ratio of a number of pixels with a grayscale value of j to the total number of the pixels of the second grayscale image.

The similarity calculating module 105 calculates a similarity value S(Ia, Ib) indicating the similarity between the first image and the second image according to the first feature vector and the second feature vector, wherein Ia represents the first image and Ib represents the second image. The similarity calculating module 105 calculates the similarity value according to a formula of $$S(Ia, Ib) = \frac{1}{D(Ia, Ib) + 1},$$

wherein $$D(Ia, Ib) = \sum_{i=0}^{n} |g_{ai} - g_{bi}|.$$

In one embodiment, a range interval of the calculated similarity value S(Ia, Ib) is (0,1]. The larger the similarity value S(Ia, Ib), the more the first image is similar to the second image. In the embodiment, n is 256, thus the first and second grayscale images are divided into 256 grayscale histograms.

The similarity determination module 107 determines whether the first image is similar to the second image by comparing the similarity value S(Ia, Ib) with a predetermined threshold and outputs a determination result. If the similarity value is greater than or equal to the predetermined threshold, the similarity determination module 107 determines the first image is similar to the second image and outputs the determination result denoting that the first image is similar to the second image. If the similarity value is less than the predetermined threshold, the similarity determination module 107 determines the first image is not similar to the second image and outputs the determination result denoting that the first image is not similar to the second image.

In the embodiment, the first image is output by a user, and the second image is a target image. If the first image is similar to the second image, the second image is displayed on a display or the first and second images are displayed on the display simultaneously. In the embodiment, the predetermined threshold is stored in the storage 13.

Figure 2:
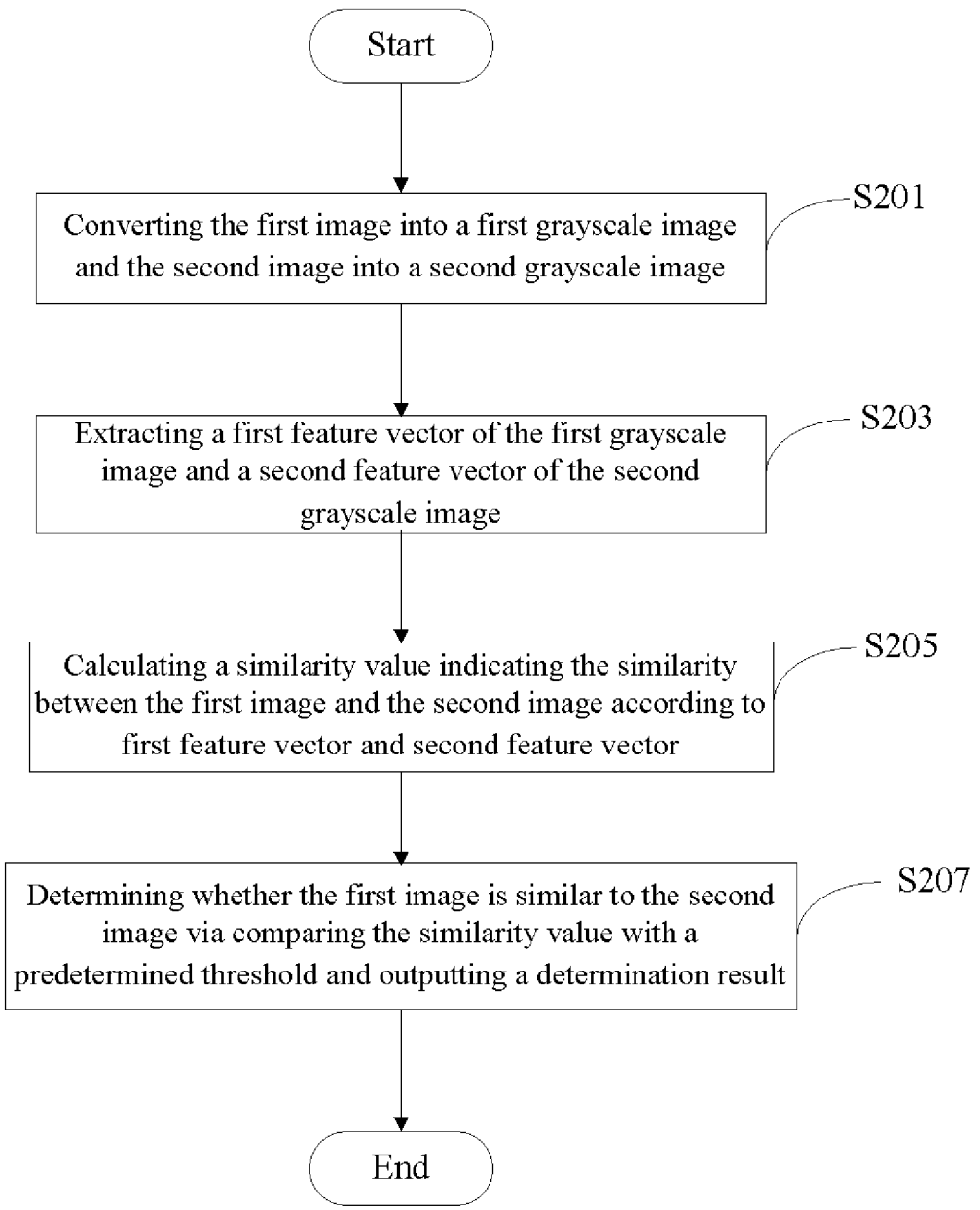
FIG. 2 is a flowchart of one embodiment of a method for determining a similarity between two images of the image processing device of FIG. 1.

FIG. 2 is a flowchart of one embodiment of a method for determining a similarity between the first image and the second image using the image processing device of FIG. 1. Depending on the embodiment, additional steps may be added, others removed, and the ordering of the steps may be changed.

In step S201, the conversion module 101 converts the first image into a first grayscale image and the second image into a second grayscale image.

In step S203, the feature extraction module 103 extracts a first feature vector of the first grayscale image and a second feature vector of the second grayscale image. In the embodiment, the first feature vector includes a set of a plurality of first proportion values, and each first proportion value is a ratio of a number of pixels having a grayscale value (0-255) to a total number of pixels of the first grayscale image. The second feature vector includes a set of second proportion values, and each second proportion value is a ratio of a number of pixels having a grayscale value to a total number of pixels of the second grayscale image.

In the embodiment, the feature extraction module 103 divides the first grayscale image and the second grayscale image into a grayscale histogram and the grayscale histogram is a graphical representation of a number of pixels of one grayscale value, and extracts the first and second feature vector from the grayscale histogram. In detail, the feature extraction module 103 divides the first and second grayscale images into n (n=$2^m$−1, m is a natural number) sub-grayscale histograms, and then extracts the first feature vector $V_a = \{g_{a0}, g_{a1}, g_{a2}, g_{a3} \ldots g_{an}\}$, wherein $g_{ai}$ (0≤i≤n) is a ratio of a number of pixels with a grayscale value of i to the total number of the pixels of the first grayscale image, and the second feature vector $V_b = \{g_{b0}, g_{b1}, g_{b2}, g_{b3} \ldots g_{bn}\}$, $g_{bj}$ (0≤j≤n) is a ratio of a number of pixels with a grayscale value of j to the total number of the pixels of the second grayscale image.

In step S205, the similarity calculating module 105 calculates a similarity value S(Ia, Ib) indicating the similarity between the first image and the second image according to first feature vector and second feature vector, wherein Ia represents the first image, and Ib represents the second image. The similarity calculating module 105 calculates the similarity value according to a formula of $$S(Ia, Ib) = \frac{1}{D(Ia, Ib) + 1},$$

and $$D(Ia, Ib) = \sum_{i=0}^{n} |g_{ai} - g_{bi}|.$$

In one embodiment, the similarity value S(Ia, Ib) is greater than 0 and less than or equal to 1. The larger the similarity value S(Ia, Ib), the more the first image is similar to the second image. In the embodiment, n is 256, thus the first and second grayscale images are divided into 256 sub-grayscale histograms.

In step S207, the similarity determination module 107 determines whether the first image is similar to the second image by comparing the similarity value S(Ia, Ib) with a predetermined threshold and outputs a determination result. If the similarity value is greater than or equal to the predetermined threshold, the similarity determination module 107 determines the first image is similar to the second image and outputs the determination result denoting that the first image is similar to the second image. If the similarity value is less than the predetermined threshold, the similarity determination module 107 determines the first image is not similar to the second image and outputs the determination result denoting that the first image is not similar to the second image.

It is to be understood that even though numerous characteristics and advantages of the present embodiments have been set forth in the foregoing description, with details of the structures and functions of the embodiments, the disclosure is illustrative only; and changes may be made in detail, especially in the matters of arrangement of parts within the principles of the embodiments to the full extent indicated by the broad general meaning of the terms in which the appended claims are expressed.

What is claimed is:

1. A computerized method for determining a similarity between a first image and a second image using an image processing device, the method comprising:
    converting the first image into a first grayscale image and the second image into a second grayscale image;
    extracting a first feature vector of the first grayscale image and a second feature vector of the second grayscale image, wherein the first feature vector comprises a set of first proportion values, each first proportion value of the first grayscale image is a ratio of a number of pixels having a grayscale value to a total number of pixels, the second feature vector comprises a set of second proportion values, and each second proportion value of the second grayscale image is a ratio of a number of pixels having a grayscale value to a total number of pixels, and extracting a first feature vector of the first grayscale image and a second feature vector of the second grayscale image comprises: dividing the first and second grayscale images into n grayscale histograms, and extracting a first feature vector $V_a=\{g_{a0}, g_{a1}, g_{a2}, g_{a3} \ldots g_{an}\}$ and a second feature vector $V_b=\{g_{b0}, g_{b1}, g_{b2}, g_{b3} \ldots g_{bn}\}$ wherein $n=2^m-1$, m is a natural number, $g_{ai}(0\le i\le n)$ is a ratio of a number of pixels with a grayscale value of i to the total number of the pixels of the first grayscale image, $g_{bj}(0\le j\le n)$ is a ratio of a number of pixels with a grayscale value of j to the total number of the pixels of the second grayscale image;

calculating a similarity value indicating the similarity between the first image and the second image according to the first feature vector and the second feature vector; and determining whether the first image is similar to the second image by comparing the similarity value with a predetermined threshold and outputting a determination result, wherein if the similarity value is greater than or equal to the predetermined threshold, the first image is similar to the second image and the outputted determination result denotes the first image is similar to the second image.

2. The method of claim 1, wherein the similarity value is obtained according to a formula of:

$$S(Ia, Ib) = \frac{1}{D(Ia, Ib)+1},$$

wherein $$D(Ia, Ib) = \sum_{i=0}^{n} |g_{ai} - g_{bi}|.$$

3. The method of claim 2, wherein the similarity value S(Ia, Ib) is greater than 0 and less than or equal to 1, and the larger the similarity value S(Ia, Ib), the more the first image is similar to the second image.

4. The method of claim 3, wherein if the similarity value is less than the predetermined threshold, the first image is not similar to the second image and the outputted determination result denoting the first image is not similar to the second image.

5. An image processing device to determine a similarity between a first image and a second image, the image processing device comprising a storage, a processor, and one or more programs stored in the storage and executed by the processor, the one or more programs comprising:

a conversion module converting the first image into a first grayscale image and the second image into a second grayscale image;

a feature extraction module extracting a first feature vector of the first grayscale image and a second feature vector of the second grayscale image, wherein the first feature vector comprises a set of first proportion values, each first proportion value is a ratio of a number of pixels having a grayscale value to a total number of pixels of the first grayscale image, the second feature vector comprises a set of second proportion values, and each second proportion value is a ratio of a number of pixels having a grayscale value to a total number of pixels of the second grayscale image, and wherein the feature extraction module divides the first and second grayscale images into n grayscale histograms, and extracts a first feature vector $V_a=\{g_{a0}, g_{a1}, g_{a2}, g_{a3} \ldots g_{an}\}$ and a second feature vector $V_b=\{g_{b0}, g_{b1}, g_{b2}, g_{b3} \ldots g_{bn}\}$ wherein $n=2^m-1$, m is a natural number, $g_{ai}(0\le i\le n)$ is a ratio of a number of pixels with a grayscale value of i to the total number of the pixels of the first grayscale image, $g_{bj}(0\le j\le n)$ is a ratio of a number of pixels with a grayscale value of i to the total number of the pixels of the second grayscale image;

a similarity calculating module calculating a similarity value indicating the similarity between the first image and the second image according to the first feature vector and the second feature vector; and a similarity determination module determining whether the first image is similar to the second image by comparing the similarity value with a predetermined threshold and outputs a determination result, wherein if the similarity value is greater than or equal to the predetermined threshold, the similarity determination module determines the first image is similar to the second image and the outputted determination result denotes that the first image is similar to the second image.

6. The image processing device of claim 5, wherein the similarity value is calculated according to a formula of:

$$S(Ia, Ib) = \frac{1}{D(Ia, Ib)+1},$$

and $$D(Ia, Ib) = \sum_{i=0}^{n} |g_{ai} - g_{bi}|.$$

7. The image processing device of claim 6, wherein the similarity value S(Ia, Ib) is greater than 0 and less than or equal to 1, and the larger the similarity value S(Ia, Ib), the more the first image is similar to the second image.

8. The image processing device of claim 7, wherein if the similarity value is less than the predetermined threshold, the first image is not similar to the second image and the outputted determination result denoting that the first image is not similar to the second image.

* * * * *